United States Patent
Nakasone

(10) Patent No.: US 11,098,503 B2
(45) Date of Patent: Aug. 24, 2021

(54) LOCK DEVICE

(71) Applicant: PIOLAX, INC., Yokohama (JP)

(72) Inventor: Hisashi Nakasone, Yokohama (JP)

(73) Assignee: PIOLAX, INC., Yokohama (JP)

( * ) Notice: Subject to any disclaimer, the term of this patent is extended or adjusted under 35 U.S.C. 154(b) by 554 days.

(21) Appl. No.: 15/776,723

(22) PCT Filed: Nov. 18, 2016

(86) PCT No.: PCT/JP2016/084219
§ 371 (c)(1),
(2) Date: May 16, 2018

(87) PCT Pub. No.: WO2017/086427
PCT Pub. Date: May 26, 2017

(65) Prior Publication Data
US 2018/0298649 A1 Oct. 18, 2018

(30) Foreign Application Priority Data

Nov. 20, 2015 (JP) .............................. JP2015-228163

(51) Int. Cl.
*E05B 79/06* (2014.01)
*E05B 83/30* (2014.01)
(Continued)

(52) U.S. Cl.
CPC ................ *E05B 79/06* (2013.01); *B60R 7/06* (2013.01); *E05B 79/14* (2013.01); *E05B 83/30* (2013.01); *E05C 1/145* (2013.01); *E05C 9/04* (2013.01)

(58) Field of Classification Search
CPC .......... E05B 79/00; E05B 79/02; E05B 79/06; E05B 79/08; E05B 79/12; E05B 79/14;
(Continued)

(56) References Cited

U.S. PATENT DOCUMENTS 4,335,595 A * 6/1982 Swan ...................... E05C 1/145
292/173
5,820,175 A * 10/1998 Clavin .................... E05C 1/145
292/165
(Continued)

FOREIGN PATENT DOCUMENTS

DE 10000863 C1 * 5/2001 ............. E05B 79/06
FR 2989407 A1 * 10/2013 ............. E05B 85/12
(Continued)

OTHER PUBLICATIONS

English Translation of Written Opinion of the International Searching Authority dated Jan. 24, 2017, in corresponding International Application No. PCT/JP2016/084219. (English version).
(Continued)

*Primary Examiner* — Kristina R Fulton
*Assistant Examiner* — Steven A Tullia
(74) *Attorney, Agent, or Firm* — McGinn I.P. Law Group, PLLC.

(57) ABSTRACT

A lock device for holding an openable and closable member mounted on an opening portion of a fixed member, includes a base member, an operation member, and a rod. The operation member has an operating portion exposed to a front side of an outer member, and a pivotally supporting portion pivotally supported on the base member. The base member has a hook portion configured to be hooked on a mounting edge portion formed on the outer member, and a locking claw portion configured to be locked on a locking edge portion formed on a rear side of the outer member to restrict the base member from moving in a direction in which the base member moves away from a rear surface of the outer member.

20 Claims, 13 Drawing Sheets

(51) Int. Cl.
*E05C 9/04* (2006.01)
*E05C 1/14* (2006.01)
*B60R 7/06* (2006.01)
*E05B 79/14* (2014.01)

(58) Field of Classification Search
CPC .......... E05B 79/16; E05B 83/00; E05B 83/28; E05B 83/30; E05C 1/00; E05C 1/08; E05C 1/212; E05C 1/14; E05C 1/145; E05C 9/00; E05C 9/04; E05C 9/042; E05C 9/043; B60R 7/00; B60R 7/04; B60R 7/06
USPC .... 292/14, 32, 35, 41, 53, 57, 58, 137, 156, 292/166, 336.3
See application file for complete search history.

(56) References Cited

U.S. PATENT DOCUMENTS

| | | | | |
|---|---|---|---|---|
| 5,884,434 | A * | 3/1999 | Dedrich | E05B 85/12 296/146.7 |
| 6,023,953 | A * | 2/2000 | Vickers | E05B 63/14 70/208 |
| 6,052,948 | A * | 4/2000 | Spitzley | E05B 79/06 49/460 |
| 6,152,501 | A * | 11/2000 | Magi | E05B 5/00 292/169 |
| 6,152,512 | A * | 11/2000 | Brown | B60R 7/06 296/37.12 |
| 6,409,234 | B1 * | 6/2002 | Larsen | E05C 1/145 292/173 |
| 6,666,496 | B2 * | 12/2003 | Rettig | E05B 79/06 292/336.3 |
| 7,036,852 | B2 * | 5/2006 | Cho | E05B 83/30 292/142 |
| 7,380,855 | B2 * | 6/2008 | Ishiguro | B60R 7/06 296/37.1 |
| 7,523,975 | B2 * | 4/2009 | Chaloupka | B60R 7/04 296/37.1 |
| 8,141,398 | B2 * | 3/2012 | Ookawara | E05C 1/145 70/208 |
| 8,590,351 | B2 * | 11/2013 | Ookawara | E05B 83/30 70/162 |
| 9,067,540 | B2 * | 6/2015 | Watanabe | B60R 7/06 |
| 2004/0017088 | A1 * | 1/2004 | Sawatani | E05B 83/30 292/178 |
| 2004/0256859 | A1 * | 12/2004 | Yamada | E05B 83/30 292/32 |
| 2006/0055196 | A1 * | 3/2006 | Yamada | E05B 63/248 296/37.12 |
| 2007/0200361 | A1 * | 8/2007 | Najima | E05B 83/30 292/216 |
| 2010/0320347 | A1 | 12/2010 | Kato | |
| 2014/0150505 | A1 | 6/2014 | Shimizu | |
| 2015/0008680 | A1 * | 1/2015 | Suzuki | E05C 1/08 292/32 |
| 2017/0009497 | A1 | 1/2017 | Nakasone | |

FOREIGN PATENT DOCUMENTS

| | | | |
|---|---|---|---|
| JP | 2011-002051 A | 1/2011 | |
| JP | 5698387 B2 * | 4/2015 | ............ E05B 77/36 |
| KR | 20060025832 A * | 3/2006 | ............ E05C 19/16 |
| WO | WO-9710402 A1 * | 3/1997 | ......... E05B 15/0006 |
| WO | WO 2013/018496 A1 | 2/2013 | |
| WO | WO 2015/125774 A1 | 8/2015 | |
| WO | WO-2015125687 A1 * | 8/2015 | ............ E05C 19/16 |

OTHER PUBLICATIONS

International Preliminary Report on Patentability dated May 22, 2018 in International Application No. PCT/JP2016/084219.
International Search Report (ISR) (PCT Form PCT/ISA/210), in PCT/JP2016/084219, dated Jan. 24, 2017.
International Search Report (ISR) (PCT Form PCT/ISA/237), in PCT/JP2016/084219, dated Jan. 24, 2017.

* cited by examiner

LOCK DEVICE

TECHNICAL FIELD

The present invention relates to a lock device to be mounted on an openable and closable member.

BACKGROUND ART

A lock device is mounted on an openable and closable member for opening and closing an opening of a glove box of a vehicle to hold the openable and closable member in a closed state. A user operates an operation member of the lock device to unlock the lock device to open the glove box.

A lock device of an openable and closable member disclosed in Patent Document 1 includes a housing fixed to the openable and closable member, a knob supported rotatably on the housing, a rotor supported rotatably on the housing, and a pair of rods coupled individually to the rotor.

The housing disclosed in Patent Document 1 has flexible engaging claws formed on both side walls and projecting pieces formed on both the side walls. In mounting the housing on the openable and closable member, the housing is inserted into a mounting hole from a front side of the openable and closable member, and the engaging claws are passed through the mounting hole while being flexed. The engaging claws are then allowed to expand to restore by virtue of a restoring force after they have passed through the mounting hole, whereby the housing is mounted in the mounting hole. With the housing completely mounted, the engaging claws are in engagement with a rear edge of the mounting hole, while the projecting pieces are in engagement with a front edge of the mounting hole, whereby the housing is restricted from moving.

PRIOR ART DOCUMENT

Patent Document

Patent Document 1: International Publication No. 2013-018496

SUMMARY OF INVENTION

Problems to Be Solved by Invention

In the technique disclosed in Patent Document 1, the housing can be mounted on the openable and closable member by being pushed in from the front side of the mounting hole. On the other hand, the rods are mounted from a rear side of the openable and closable member. Thus, a mounting process of the lock device on the openable and closable member becomes complex and troublesome due to involving the step of mounting the housing from the front side and the step of mounting the rods from the rear side of the openable and closable member.

The invention has been made in view of the problem, and an object thereof is to provide a lock device capable of being mounted easily on an openable and closable member.

Means for Solving Problems

To solve the problem, according to an aspect of the invention, there is provided a lock device capable of holding an openable and closable member mounted on an opening portion of a fixed member so as to be opened and closed in a locked state and provided in a space defined by an outer member and an inner member of the openable and closable member, the lock device including: a base member fixed to the outer member; an operation member supported rotatably on the base member; and a rod configured to be engaged with and disengaged from a locking portion of the fixed member in association with rotations of the operation member. The operation member has an operating portion exposed to a front side of the outer member and a pivotally supporting portion pivotally supported on the base member. The base member has a hook portion configured to be hooked on a mounting edge portion formed on the outer member and a locking claw portion configured to be locked on a locking edge portion formed on a rear side of the outer member to restrict the base member from moving in a direction in which the base member moves away from a rear surface of the outer member.

According to another aspect of the invention, there is provided a lock device capable holding an openable and closable member mounted on an opening portion of a fixed member so as to be opened and closed in a locked state and provided in a space defined by an outer member and an inner member of the openable and closable member, the lock device including: a base member fixed to the inner member; an operation member supported rotatably on the base member; and a rod configured to be engaged with and disengaged from a locking portion of the fixed member in association with rotations of the operation member. The operation member has an operating portion exposed to a front side of the outer member and a pivotally supporting portion pivotally supported on the base member. The base member has a hook portion configured to be hooked on a mounting edge portion formed on a rear side of the inner member and a locking claw portion configured to be locked on a locking edge portion formed on the rear side of the inner member to restrict the base member from moving in a direction in which the base member moves away from a rear surface of the inner member.

Advantageous Effects of Invention

According to the invention, the lock device can be provided which is easily mounted on the openable and closable member.

EMBODIMENTS OF INVENTION

Figure 1:
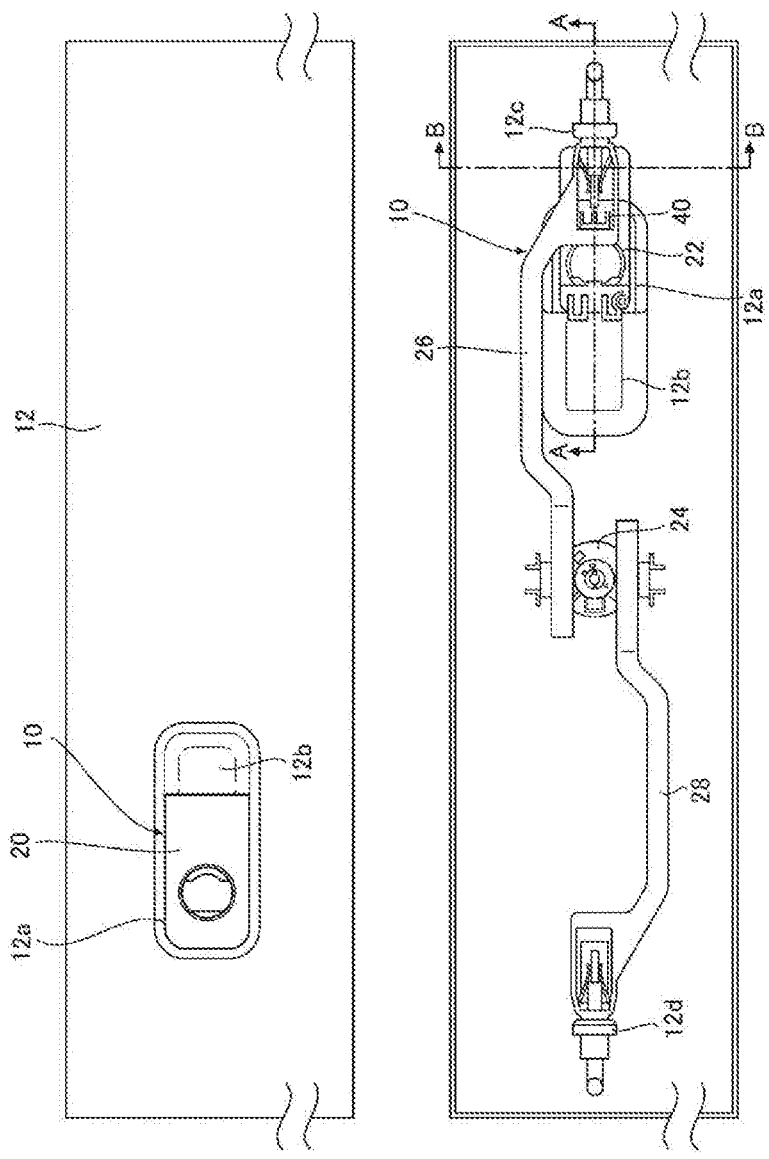
FIGS. 1A and 1B show explanatory drawings of a lock device according a first embodiment.

FIGS. 1A and 1B show explanatory drawings of a lock device 10 according to a first embodiment. FIG. 1A is a front view of the lock device 10 and an openable and closable member as seen from a front side of the openable and closable member, and FIG. 1B is a rear view of the lock device 10 and the openable and closable member as seen from a rear side of the openable and closable member. In reality, the openable and closable member is provided by affixing two plate-shaped members together and accommodates the lock device 10 in an interior space thereof. However, in FIG. 1B, the lock device 10 and the openable and closable member are shown with a rear inner member of the openable and closable member covering the lock device 10 omitted from illustration.

The openable and closable member is, for example, a lid member for a glove box of a vehicle and is made up of an outer member 12 and an inner member. Although the outer member 12 of the openable and closable member is shown as having a flat planar shape as a matter of conveniences in illustration in FIGS. 1A and 1B, in reality, the outer member 12 of the openable and closable member is formed to match the shape of an opening portion of the glove box and hence may be formed into the shape of a curved plane. The glove box is a fixed member having a recess which is an accommodation space provided in an instrument panel, and the openable and closable member is mounted rotatably on the glove box to open and close an opening portion of the recess. With the openable and closable member left in a closed state, the outer member 12 is exposed to a front of a front passenger's seat, and the inner member is located in an interior of the recess. Alternatively, an accommodating portion may be provided on the openable and closable member, causing a glove box itself to function as an openable and closable member, and the accommodating space of the glove box may be opened by rotating the glove box.

A mounting opening 12a is formed in the outer member 12 of the openable and closable member for the lock device 10 to be mounted therein. The lock device 10 mounted on the openable and closable member holds the openable and closable member in a closed state relative to the opening portion of the glove box with the openable and closable member 12 locked. The lock device 10 of the embodiment is a side lock device in which an operation member 20 can be operated in a width direction of the openable and closable member.

The lock device 10 includes the operation member 20, a base member 22, a rotary member 24, a first rod 26, and a second rod 28. The lock device 10 is provided in an accommodation space defined between the outer member 12 and the inner member of the openable and closable member. The base member 22 is fixed to the outer member 12. The operation member 20 is supported rotatably on the base member 22. As shown in FIG. 1A, the operation member 20 is exposed to a front side of the mounting opening 12a. A user inserts his or her finger from a depressed portion 12b into a rear side of the operation member 20 and then pulls up the operation member 20 to release the openable and closable member from a locked state. A rear side of the outer member 12 and a rear side of the inner member are positioned in the accommodation space for accommodating the lock device 10, and a front side of the outer member 12 and a front side of the inner member are positioned in an exposed exterior space.

The rotary member 24 is supported rotatably on the outer member 12 and is coupled to the first rod 26 and the second rod 28 (the first rod 26 and the second rod 28 are referred to simply as a rod or rods in the case where no discrimination is necessary between them). An operation force exerted by the user is transmitted from the operation member 20 to the first rod 26 shown in FIG. 1B, then from the first rod 26 to the rotary member 24, and further from the rotary member 24 to the second rod 28. The rotary member 24 rotates in response to a rotation of the operation member 20. The rods reciprocate in a longitudinal direction in association with rotations of the rotary member 24. The rods can be brought into engagement with and disengagement from lock holes in the fixed member in association with rotations of the operation member 20, that is, can be brought into engagement with the lock holes and disengagement from the lock holes.

The first rod 26 is passed through a first supporting hole portion 12c of the outer member 12, and the second rod 28 is passed through a second supporting hole portion 12d of the outer member 12. When a rear side of the lock device 10 is covered to be hidden by the inner member of the openable and closable member which is not shown in FIG. 1B, a distal end portion 26a of the first rod 26 is exposed to an exterior portion, and a distal end portion 28a of the second rod 28 is exposed to an exterior portion. In the first rod 26 and the second rod 28, ends inserted into a first lock hole and a second lock hole of the glove box are referred to as distal ends, whereas ends coupled to the rotary member 24 are referred to as proximal ends.

The first supporting hole portion 12c and the second supporting hole portion 12d of the outer member 12 are formed to penetrate wall portions which project from a rear surface of the outer member 12. An elastic portion may be provided on each of circumferential edges of through holes in the first supporting hole portion 12c and the second supporting hole portion 12d so as to be brought into elastic contact with the rod to guide a movement of the rod while suppressing the looseness of the rod.

The rotary member 24 rotates when the user operates the operation member 20, and the rods move into and out of the first lock hole and the second lock hole which are formed in the glove box which is the fixed member as the rotary member 24 rotates. The openable and closable member is locked when the distal end portions of the rods move into the corresponding lock holes in the glove box, while the openable and closable member is unlocked when the distal ends of the rods move out of the corresponding lock holes. Directions in which the rods move into the corresponding lock holes are referred to as traveling directions of the rods, while directions in which the rods move out of the corresponding hock holes are referred to as receding directions of the rods.

The rotary member 24 has a spring member (not shown) provided thereon to bias the rods in their traveling directions. Additionally, another spring member (not shown) is provided on the operation member 20 to bias the operation member 20 into a closed state.

Figure 2:
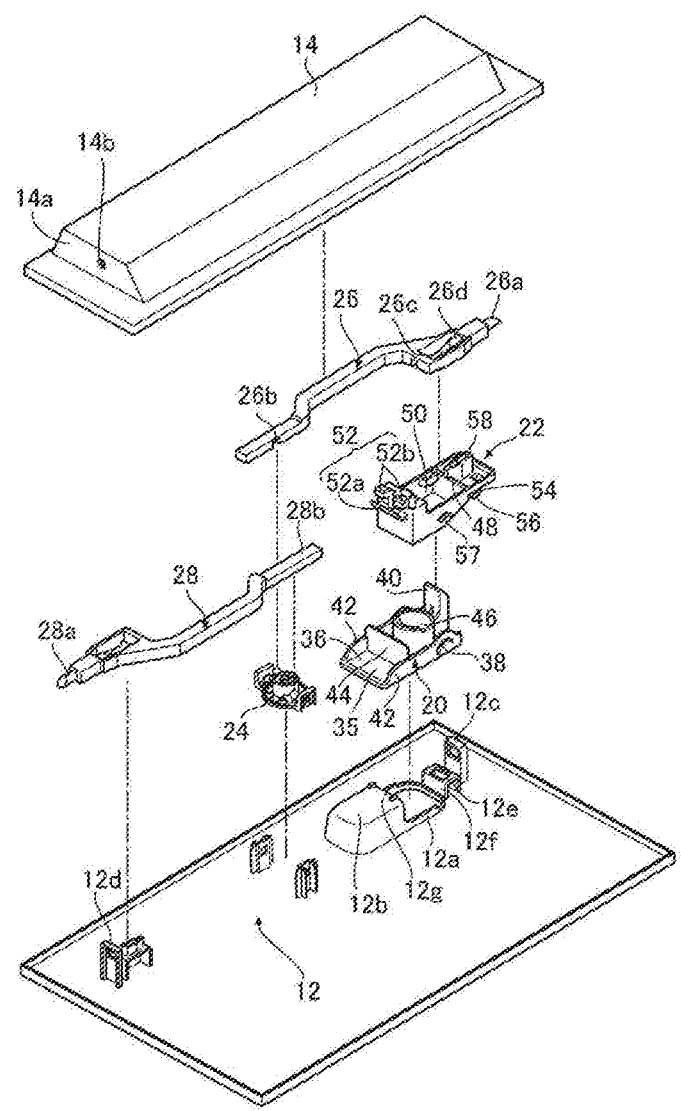
FIG. 2 is an exploded view of the lock device.
Figure 3A:
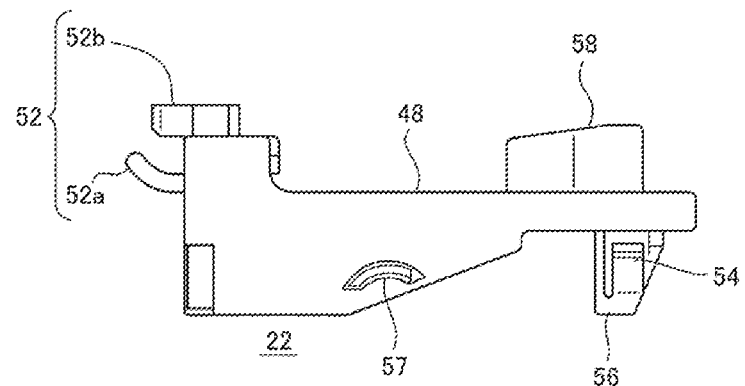
FIG. 3A is a side view of a base member.
Figure 3B:
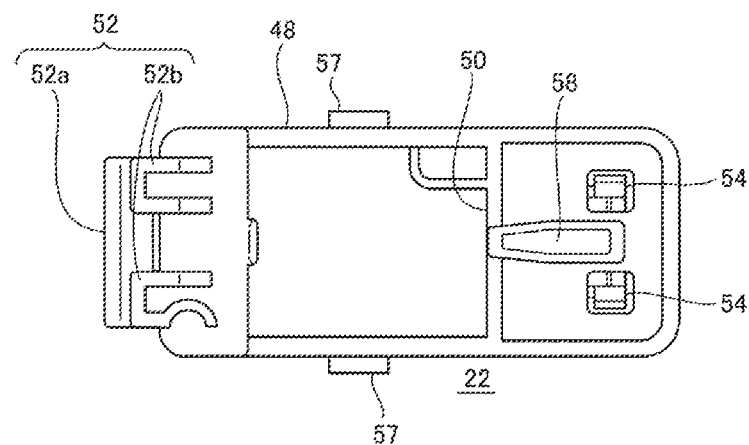
FIG. 3B is a rear view of the base member.
Figures 4A, 4B:
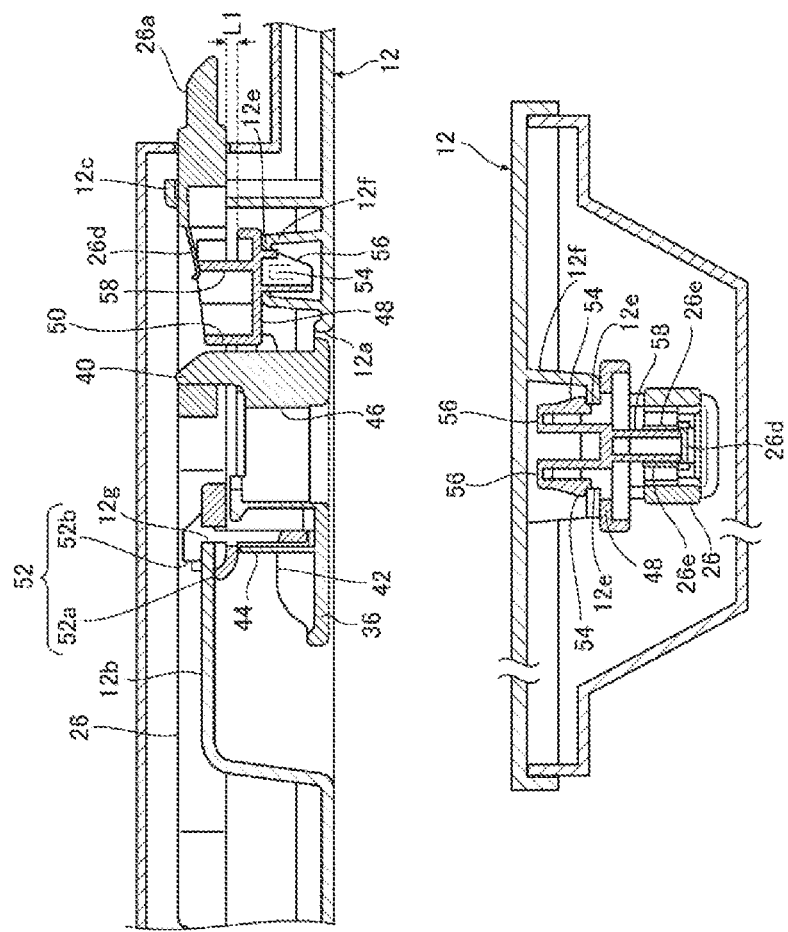
FIG. 4A is a sectional view of the lock device taken along a line A-A shown in FIG. 1B.
FIG. 4B is a sectional view of the lock device taken along a line B-B shown in FIG. 1B.

FIG. 2 is an exploded view of the lock device 10. FIG. 3A is a side view of the base member 22. FIG. 3B is a rear view of the base member. In addition, FIG. 4A is a sectional view of the lock device 10 shown in FIG. 1B taken along a line A-A shown therein, and FIG. 4B is a sectional view of the lock device 10 shown in FIG. 1B taken along a line B-B shown therein. FIG. 2 shows the outer member 12 and the inner member 14 in addition to the lock device 10. In FIG. 2, the base member 22 is shown as being integrated with the operation member 20 and supporting pivotally the operation member 20 and is mounted in the mounting opening 12a of the outer member 12.

The operation member 20 has a base portion 35, an operating portion 36, a pair of shaft portions 38, a transmitting portion 40, a pair of side wall portions 42, a middle wall portion 44 and a key cylinder bore portion 46. The operating portion 36 is formed on the base portion 35 having a flat plate shape and is positioned on the front side of the outer member 12 so that a finger of a hand of the user is hooked on the operating portion 36.

The pair of side wall portions 42 are erected to face each other on a rear surface of the base portion 35. The pair of shaft portions 38 are formed individually into an arc shape on the pair of side wall portions 42. The pair of shaft portions 38 are disposed nearer to the transmitting portion 40 than the operating portion 36 in a reciprocating direction of the rods or in a transverse direction of the vehicle.

The middle wall portion 44 is erected on the rear surface of the base portion 35 to couple the pair of side wall portions 42 together. As shown in FIG. 4A, the middle wall portion 44 covers an internal structure of the lock device 10 to prevent the finger of the hand of the user from entering an interior portion of the lock device 10.

The transmitting portion 40 has a pillar-like shape and is erected from the rear surface of the base portion 35 to project to the rear side of the outer member 12 as shown in FIG. 4A. The transmitting portion 40 is brought into engagement with a bearing surface 26c of the first rod 26 to transmit an operation force exerted on the operation member 20 to the first rod 26. The key cylinder bore portion 46 is formed in the base portion 35 so as to penetrate it for a key cylinder to be mounted therein. Further, in a modified example, the key cylinder bore portion 46 may not be formed, and therefore the key cylinder may not be provided on the operation member 20.

The base member 22 has a base frame portion 48, a passage portion 50, a hook portion 52, a locking claw portion 54, a supporting portion 56, a pivotally supporting portion 57 and a first guide portion 58. The passage portion 50 is formed in the base frame portion 48 so as to penetrate the base frame portion 48 to allow the transmitting portion 40 of the operation member 20 to pass therethrough to the rear side of the outer member 12 as shown in FIG. 3B. The pivotally supporting portion 57 is formed into the shape of an arc-like projection. In this embodiment, the pivotally supporting portion 57 includes a pair of pivotally supporting portions which are formed on both side surfaces of the base frame portion 48. The pivotally supporting portions 57 are inserted into the corresponding shaft portions 38 to support the operation member 20 rotatably.

The hook portion 52 is hooked on a mounting edge portion 12g at a side of the depressed portion 12b of the mounting opening 12a to prevent the base member 22 from being disengaged from the outer member 12. The hook portion 52 is positioned at one end of the base frame portion 48 and is formed so as to project in a receding direction of the first rod 26.

The hook portion 52 has a front hook portion 52a and a rear hook portion 52b which face each other on the front side and the rear side of the outer member 12 as shown in FIG. 3A.

As shown in FIG. 4A, the front hook portion 52a is hooked on a front side of the mounting edge portion 12g to prevent the base member 22 from being dislocated to the rear side of the outer member 12. The rear hook portion 52b is hooked on a rear side of the mounting edge portion 12g to prevent the base member 22 from being dislocated to the front side of the outer member 12. The front hook portion 52a and the rear hook portion 52b hold the mounting edge portion 12g therebetween.

As shown in FIG. 2, the front hook portion 52a is formed substantially into a semi-cylindrical shape and is formed longer than the rear hook portion 52b in the direction of a rotational axis of the operation member 20. The rear hook portion 52b includes a pair of rear hook portions which are formed so as to be spaced apart from each other in the direction of the rotational axis of the operation member 20. The front hook portion 52a projects longer than the rear hook portions 52b in the receding direction of the first rod 26.

The locking claw portion 54 includes a pair of locking claw portions 54 which are formed on a front side of the base frame portion 48 as shown in FIG. 4B. The locking claw portions 54 have elasticity and can be flexed. The supporting portion 56 is formed to project from a front surface of the base frame portion 48 to support the locking claw portions 54. The locking claw portions 54 extend in a direction normal to a surface of the outer member 12, that is, a direction in which the inner member and the outer member 12 of the openable and closable member face each other. The locking claw portions 54 are formed so as to hang from the supporting portion 56 and are locked on a locking edge portion 12e formed on the rear side of the outer member 12 to restrict the base member 22 from moving in a direction in which the base member 22 moves away from the rear surface of the outer member 12. The locking edge portion 12e are formed into the shape of a hole in a sitting surface of a mounting seat portion 12f formed on the rear surface of the outer member 12. The locking claw portions 54 and the supporting portion 56 are inserted into the locking edge portion 12e and is accommodated in a space within the mounting seat portion 12f.

The first guide portion 58 is formed on a rear surface of the base frame portion 48 so as to project into the shape of a pillar shape as shown in FIG. 3A to guide a slide of the first rod 26. Elastic pieces of the first rod 26 are brought into elastic contact with a distal end portion and both side portions the first guide portion 58 so as to slide thereon. The first guide portion 58 is positioned so as to overlap the locking claw portions 54 in the reciprocating direction of the first rod 26.

The rotary member 24 is positioned at a center of the outer member 12 and is supported rotatably on the outer member 12. A first coupling portion 26b at a proximal end side of the first rod 26 and a second coupling portion 28b at a proximal end side of the second rod 28 are coupled to the rotary member 24.

The first rod 26 and the second rod 28 have the same shape and hence share parts in common, whereby the production costs are suppressed. A distal end portion 28a of the second rod 28 projects from a through hole 14b formed in a side wall 14a of the inner member 14 shown in FIG. 2. Similarly, a distal end portion 26a of the first rod 26 projects from a through hole formed in a side wall of the inner member 14. The first rod 26 has the bearing surface 26c which is brought into abutment with the transmitting portion 40 of the operation member 20 and recedes as a result of the bearing surface 26c bearing an operation force exerted from the transmitting portion 40. As shown in FIG. 4B, the first rod 26 has a first elastic piece 26d which is brought into elastic contact with the distal end portion of the first guide portion 58 of the base member 22 and a second elastic piece 26e which is brought into elastic contact with both the side portions of the first guide portion 58. The first rod 26 is curved to avoid an interference with the depressed portion 12b, thereby making it possible to make the openable and closable member thin.

As shown in FIGS. 1B and 4A, the first rod 26 overlaps partially the base member 22 in a direction in which the outer member 12 and the inner member 14 face each other. A shortest distance L1 between the first rod 26 and the base member 22 in the position where they partially overlap each other is smaller than a length of the locking claw portion 54 in the facing direction. More preferably, the shortest distance L1 may be smaller than a projecting length of the locking claw portion 54 which project into the space defined inside the mounting seat portion 12f. By adopting this configuration, in the event that the locking claw portions 54 are unlocked to be disengaged from the locking edge portion 12e, the base member 22 is brought into abutment with the first rod 26 before the locking claw portions 54 are dislocated from the locking edge portion 12e, restricting the locking claw portions 54 from being disengaged from the locking edge portion 12e.

Figure 5:
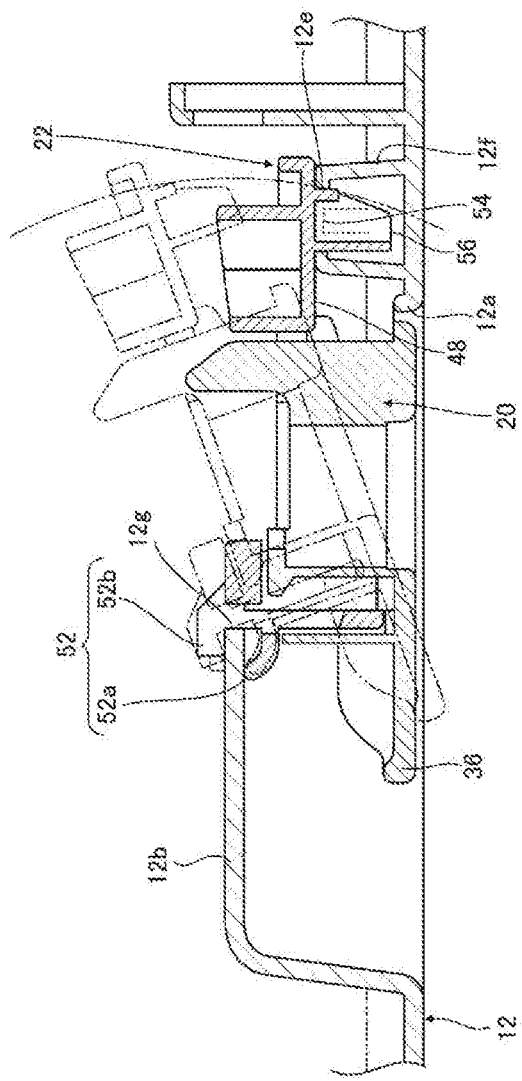
FIG. 5 is an explanatory drawing of a process of mounting the base member on an outer member of an openable and closable member.

FIG. 5 is an explanatory drawing of a process of mounting the base member 22 on the outer member 12 of the openable and closable member. The base member 22 is mounted from the rear side of the outer member 12 while supporting the operation member 20 pivotally. The operation member 20 is pivotally supported on the base member 22.

Since the rotary member 24, the first rod 26 and the second rod 28 are mounted from the rear side of the outer member 12 as the subassembly is done, all the members of the lock device 10 can be mounted from the rear side of the outer member 12. Due to this configuration, the outer member 12 is placed on a mounting base with its front side down in the mounting process, and in this state, the lock device 10 and the inner member are mounted thereon in that order, whereby the openable and closable member can be built up, thereby making it possible to facilitate the mounting work.

The mounting process of the operation member 20 and the base member 22 will be described specifically. The operator inserts the operating portion 36 of the operation member 20 into the mounting opening 12a from the rear side of the outer member 12 and hooks the rear hook portions 52h of the base member 22 on the mounting edge portion 12g to position the operation member 20. Next, the operator rotates the base member 22 about the rear hook portions 52b of the base member 22 as a fulcrum and pushes the pair of locking claw portions 54 into the locking edge portion 12e while flexing the pair of locking claw portions 54. When having passed through the locking edge portion 12e, the pair of locking claw portions 54 are allowed to expand to restore by virtue of the restoring force and are locked on the locking edge portion 12e, whereby the base member 22 is mounted on the outer member 12. With the base member 22 mounted completely, the front hook portion 52a and the rear hook portions 52b of the base member 22 hold the mounting edge portion 12g therebetween, and the locking claw portions 54 and the base frame portion 48 hold the locking edge portion 12e therebetween.

In this way, when compared with a case where the base member 22 is fixed to the operation member 20 with screws or the like, the base member 22 can be mounted on the operation member 20 more easily since the base member 22 is positioned properly using the hook portion 52, whereafter the locking claw portions 54 only have to be pushed into the locking edge portion 12e to complete the mounting work. In addition, it is possible to reduce a risk of a designed surface on the front side of the outer member 12 being damaged by mounting the lock device 10 from the rear side of the outer member 12.

Figure 6:
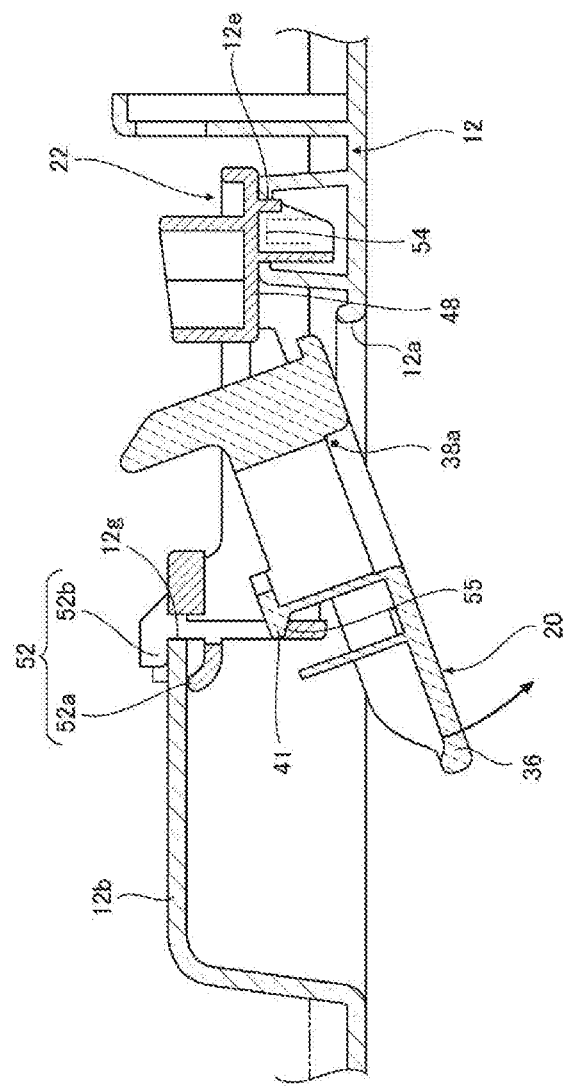
FIG. 6 is an explanatory view explaining a load exerted on the base member when opening an operation member.

FIG. 6 is an explanatory drawing explaining a load exerted on the base member 22 when the operation member 20 is opened. The operation member 20 rotates about a rotational center 38a of the shaft portions 38 by pulling the operating portion 36 in the opening direction. The rotation of the operation member 20 in the opening direction is stopped as a result of a rotation stopping portion 41 of the operation member 20 being brought into abutment with a stopper portion 55 of the base member 22.

The rotation stopping portion 41 of the operation member 20 is formed on a rear edge of the key cylinder bore portion 46. The stopper portion 55 of the base member 22 is formed in such a way as to cut out a wall erected from a root of the hook portion 52.

A force, with which the rotation of the operation member 20 in the opening direction is stopped, is inputted from the stopper portion 55 into the locking claw portions 54 and the hook portion 52 and is then borne by the outer member 12. In the base member 22, the stopper portion 55 is positioned nearer to the hook portion 52 than the locking claw portions 54, and the force inputted into the locking claw portions 54 becomes smaller than the force inputted into the hook portion 52. This can prevent a greater force from being inputted into the locking claw portions 54 whose load bearing performance is inferior to that of the hook portion 52.

The shaft portions 38 are positioned between the hook portion 52 and the locking claw portions 54 in the reciprocating direction of the first rod 26. This can provide a space between the hook portion 52 and the locking claw portions 54, and with the space, the base member 22 is stabilized relative to the outer member 12 when the base member 22 is mounted on the operation member 20 completely, thereby making it possible to suppress the generation of rattling of the base member 22.

In addition, the locking claw portions 54 are positioned between the mounting opening 12a and the first supporting hole portion 12c in the reciprocating direction of the first rod 26. Namely, the locking claw portions 54 are disposed outside the mounting opening 12a. This can position the locking claw portions 54 farther away from the hook portion 52 and the rotation stopping portion 41 when compared with a case where the locking claw portions are locked on an edge of the mounting opening 12a. With the locking claw portions 54 spaced farther away from the hook portion 52 and the rotation stopping portion 41, the base member 22 is stabilized relative to the outer member 12 when the base member 22 is mounted on the operation member 20 completely, thereby making it possible to suppress the generation of rattling of the base member 22.

Figure 7:
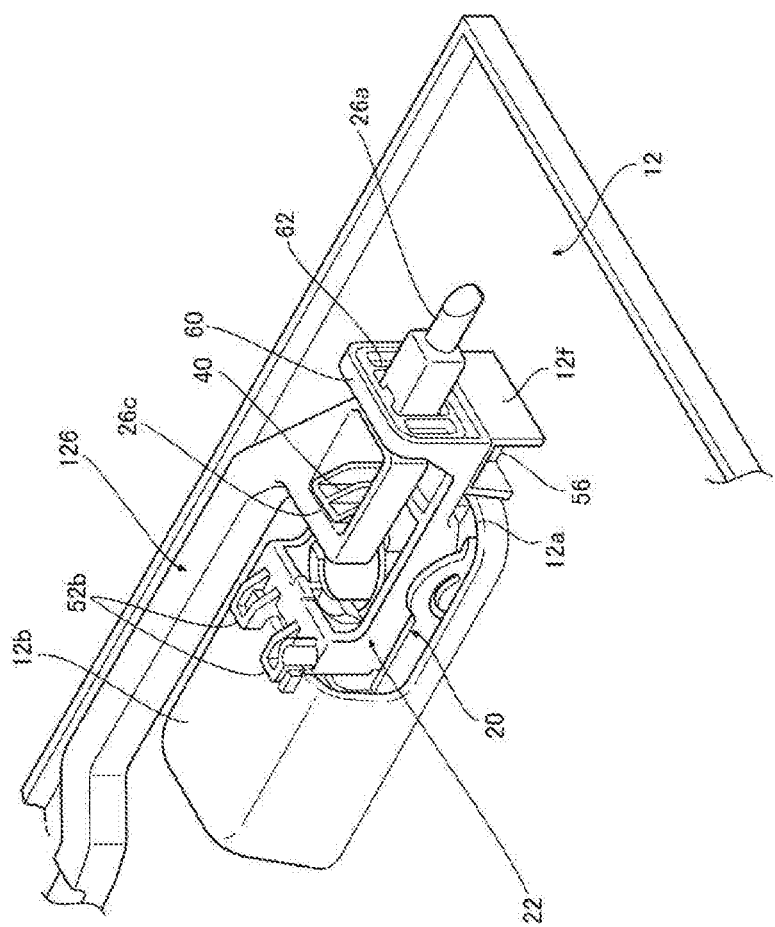
FIG. 7 is an explanatory drawing of a lock device of a first modified example made to the first embodiment.

FIG. 7 is an explanatory drawing of a lock device according to a first modified example made to the first embodiment. FIG. 7 shows a perspective view of the lock device mounted on an outer member 12. The lock device according to the first modified example differs from the lock device 10 shown in FIG. 2 in that a first supporting hole portion 60 which supports a first rod 126 is formed not on an outer member 12 but on a base member 122.

The first supporting hole portion 60 on the base member 122 is formed into an annular shape on a rear side of a base frame 48. An elastic portion 62 is provided on an inner circumference of the first supporting hole portion 60. This elastic portion 62 is brought into elastic contact with the first rod 126 to guide a movement of the first rod 126 while suppressing a rattling of the first rod 126. The first supporting hole portion 60 is provided in a position where the first supporting hole portion 60 overlaps locking claw portions 54 in a direction which is at right angles to a surface of the outer member 12, that is, in a direction in which the outer member 12 and an inner member face each other. In the first modified example, the first supporting hole portion 60 of the base member 122 is provided in the position where the first guide portion 58 of the base member 22 shown in FIG. 4A is provided. This allows an operation member 20 and a mounting opening 12a to be positioned nearer to the first supporting hole portion 60, whereby the operation member 20 can be positioned nearer to a driver's seat.

Figures 8A, 8B:
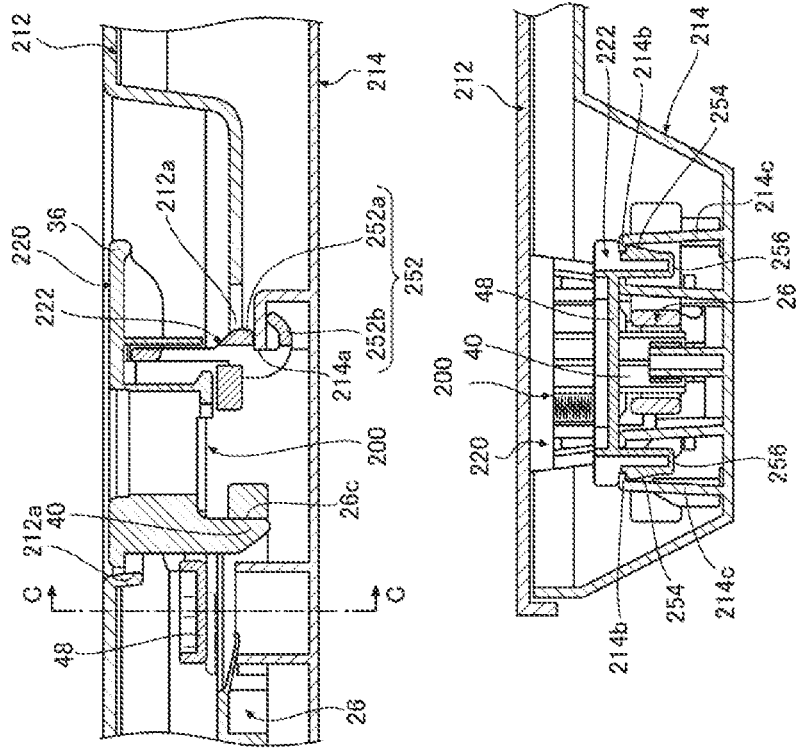
FIGS. 8A and 8B show explanatory drawings of a lock device of a second modified example made to the first embodiment.

FIGS. 8A and 8B are explanatory drawings of a lock device 200 according to a second modified example made to the first embodiment. FIG. 8A is a sectional view of the lock device, taken along a reciprocating direction of a first rod 26, and FIG. 8B shows a section of the lock device taken along a line C-C shown in FIG. 8A.

When compared with the lock device 10 shown in FIG. 4A, the lock device 200 according to the second modified example differs from the lock device 10 in that the lock device 200 is mounted not on an outer member 212 but on an inner member 214. With a base member 222 of the lock device 200 fixed to the inner member 214, an operation member 220 is pivotally supported on the base member 222 and is exposed to a front side of the outer member 212 from an exposing opening 212a in the outer member 212.

The base member 222 has a hook portion 252 which is hooked on a mounting edge portion 214a of the inner member 214 as shown in FIG. 8A and a locking claw portion 254 which is locked on a locking edge portion 214b of the inner member 214 as shown in FIG. 8B.

As shown in FIG. 8A, the mounting edge portion 214a formed on a rear side of the inner member 214 faces a rear surface of the inner member 214 while being spaced apart therefrom. A first hook portion 252a is hooked on the mounting edge portion 214a to restrict the base member 222 from moving in a direction in which the base member 222 moves towards the inner member 214, and a second hook portion 252b is hooked on the mounting edge portion 214a to restrict the base member 222 from moving in a direction in which the base member 222 moves away from the inner member 214.

As shown in FIG. 8B, a locking edge portion 214b is formed on the rear side of the inner member 214. The locking edge portion 214b is formed into the shape of a hole in a sitting surface of a mounting seat portion 214c erected on the rear surface of the inner member 214. The locking claw portion 254 is supported on a supporting portion 256 and is locked on the locking edge portion 214b. In this modified example, the locking claw portion 254 is made up of a pair of locking claw portions which are formed on both sides of the base member 222, and the locking edge portion 214b on which the locking claw portion 254 is locked on is also made up of a pair of locking edge portions.

The pair of locking claw portions 254 are spaced apart from each other, and the first rod 26 is passed through a space defined therebetween. In this way, providing the pair of locking claw portions 254 on both the sides of the base member 222 enables the base member 222 to be locked in a stable fashion when the base member 222 is mounted on the operation member 220, and disposing the first rod 26 therebetween can make the lock device 200 thin.

A mounting process of mounting the lock device 200 on the openable and closable member will be described. The operator grabs on a subassembly in which the operation member 220 is assembled to the base member 222, hooks the hook portion 252 on the mounting edge portion 214a and rotates the base member 222 about the hook portion 252 as a fulcrum while pushing in the locking claw portions 254 from the rear side of the inner member 214 towards the locking edge portions 214b to lock the locking claw portions 254 on the corresponding locking edge portions 214b. A rotary member 24, the first rod 26 and a second rod 28 are mounted on the inner member 214 after the base member 222 and the operation member 220 are mounted on the inner member 214, and the outer member 212 is closed, completing the mounting process of the lock device 220.

According to the lock device 220 of the second modified example, the constituent members of the lock device 200 can be mounted on the rear side of the inner member 214, and the outer member 212 only has to be closed after the lock device 200 is so mounted. Thus, the mounting process can be facilitated.

Figure 9A:
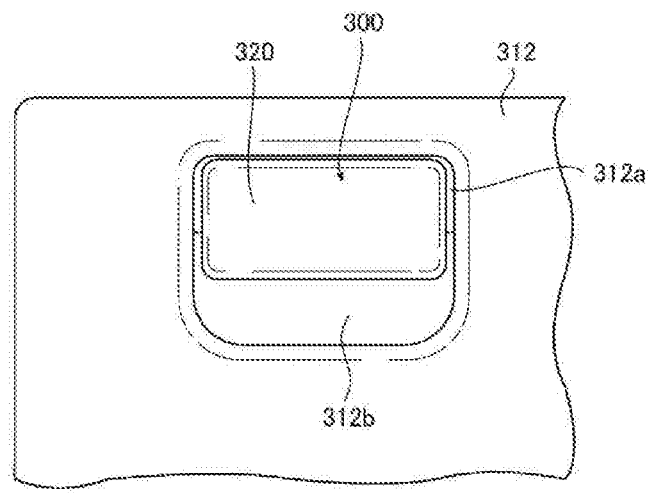
FIGS. 9A and 9B show explanatory drawings of a lock device of a second embodiment.
Figure 9B:
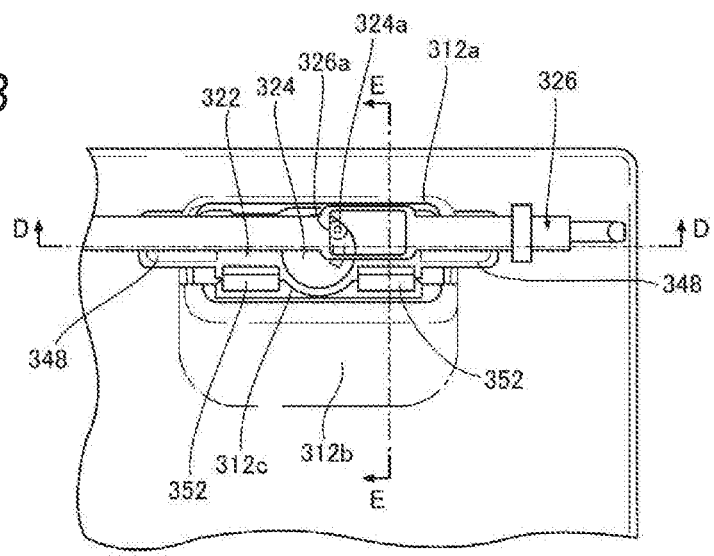

FIGS. 9A and 9B show explanatory drawings of a lock device 300 according to a second embodiment. FIG. 9A is a front view of the lock device 300 and a closable and openable member as seen from a front side of the openable and closable member. FIG. 9B is a rear view of the lock device 300 and the openable and closable member as seen from a rear side of the openable and closable member. In reality, the openable and closable member is formed by affixing two plate-shaped members together, and the lock device 300 is accommodated in a space defined between the two plate-shaped members. However, in FIG. 9B, a rear inner member of the openable and closable member that covers the lock device 300 is omitted from illustration. In the lock device 300 shown in FIGS. 9A and 9B, a part of a first rod 326 and a second rod are omitted from illustration.

When compared with the lock device 10 of the first embodiment shown in FIG. 1A, the lock device 300 of the second embodiment shown in FIG. 9A differs from the lock device 100 in a direction in which an operation member 320 is operated. Namely, in the lock device 10 shown in FIG. 1A, the operation member 20 is operated in the transverse direction of the vehicle, however, in the lock device 300 shown in FIG. 9A, the operation member 320 is operated upwards and towards the operator. The lock device 300 of the second embodiment is identical with the lock device 10 of the first embodiment in that constituent members of the lock device 300 are mounted from a rear side of an outer member 312 of an operable and closable member.

The lock device 300 includes the operation member 320, a base member 322, a rotary member 324, the first rod 326 and a second rod 328. Additionally, the lock device 300 includes a spring member for biasing the first rod 326 and the second rod 328 in locking directions and a spring member for biasing the operation member 320 into a closed state.

As shown in FIG. 9A, the lock device 300 is mounted in a mounting opening 312a of the outer member 312, and the operation member 320 is exposed to a front side of the outer member 312. The user puts a finger of his or her hand in a depressed portion 312b on the outer member 312 and operates the operation member 320 in such a way as to pull the operation member 320 upwards and towards him or her to unlock the operation member 320.

As shown in FIG. 9B, the rotary member 324 is accommodated in the base member 322 and is supported rotatably therein. The rotary member 324 rotates as the operation member 320 rotates. The rotary member 324 has a projecting portion 324a disposed eccentric with respect to a rotational axis of the rotary member 324. As the rotary member 324 rotates, the projecting portion 324a pushes on a bearing surface 326a of the first rod 326 to move the first rod 326.

Figure 10:
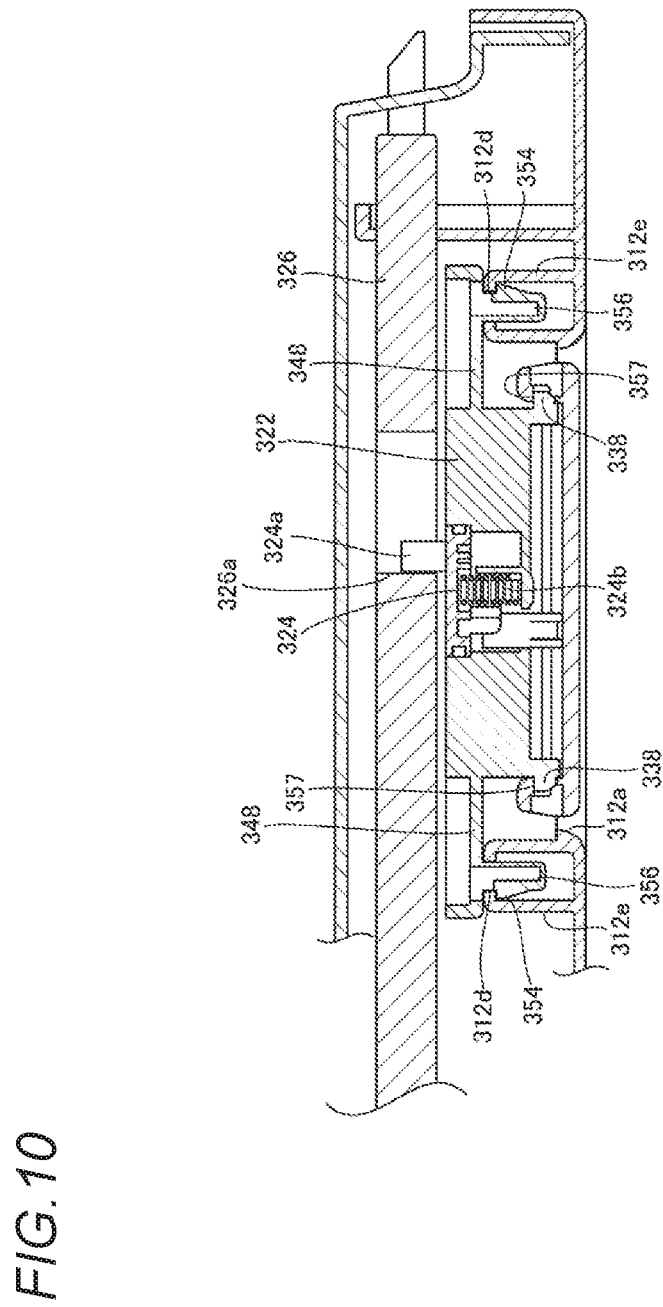
FIG. 10 is a sectional view of the lock device taken along a line D-D shown in FIG. 9B.

FIG. 10 is a sectional view of the lock device 300 shown in FIG. 9B taken along a line DD shown therein. A central shaft portion 324h of the rotary member 324 is supported pivotally on the base member 322. Additionally, shaft portions 338 of the base member 322 are inserted in hole-shaped pivotally supporting portions 357 in the operation member 320, whereby the base member 322 supports the operation member 320 rotatably.

The base member 322 has a flange portion 348 which protrudes outwards in a width direction from the mounting opening 312a. The flange portion 348 includes a pair of flange portions formed on both sides of the base member 322, Supporting portions 356 are erected individually from front surfaces of the pair of flange portions 348 to support the locking claw portions 354. The locking claw portions 354 extend from distal end sides of the supporting portions 356 towards the corresponding flange portions 348 and have elasticity. The locking claw portions 354 are positioned above a hook portion 352.

The locking claw portions 354 are locked on a locking edge portion 312d formed on the rear side of the outer member 312 to restrict the base member 322 from moving in a direction in which the base member 322 moves away from a rear surface of the outer member 312. The locking edge portion 312d is formed into the shape of a hole in a sitting surface of a mounting seat portion 312e erected on the rear surface of the outer member 312.

Figure 11:
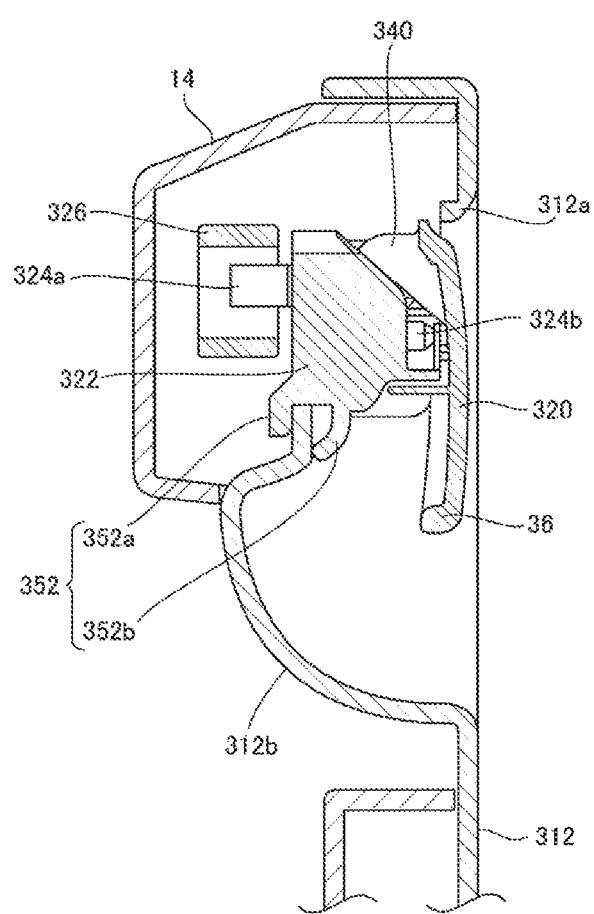
FIG. 11 is an explanatory drawing of the lock device taken along a line E-E shown in FIG. 9B.

FIG. 11 is a sectional view of the lock device 300 shown in FIG. 9B taken along a line EE shown therein showing a glove box 14 of a vehicle and the operating portion 36. A transmitting portion 340 is formed in an upper end position on a rear surface of the operation member 320 so as to project from the rear surface of the operation member 320. The transmitting portion 340 is coupled to the rotary member 324 and moves downwards as the operation member 320 is operated to open the openable and closable member to rotate the rotary member 324.

The base member 322 has the hook portion 352 extending downwards. The hook portion 352 is hooked on a mounting edge portion 312c which defines the mounting opening 312a of the outer member 312. The mounting edge portion 312c is positioned at a lower end of the mounting opening 312a and is positioned at an upper end of the depressed portion 312b.

A first hook portion 352a of the hook portion 352 is hooked on the mounting edge portion 312c to restrict the base member 322 from moving in a direction in which the base member 322 is disengaged to a front side of the outer member 312. A second hook portion 352b is hooked on the mounting edge portion 312c to restrict the base member 322 from moving in a direction in which the base member 322 is disengaged to the rear side of the outer member 312.

The operator grabs on a subassembly in which the operation member 320 is assembled to the base member 322, hooks the hook portion 352 on the mounting edge portion 312c and rotates the base member 322 about the hook portion 352 as a fulcrum while pushing in the locking claw portions 354 from the rear side of the outer member 312 towards the locking edge portion 312d to lock the locking claw portions 354 on the locking edge portion 312.d. The rotary member 324, the first rod 326 and the second rod 328 are mounted on the outer member 312 after the base member 322 and the operation member 320 are mounted on the outer member 312, and the inner member is closed, completing the mounting process of the lock device. In this way, with the lock device 300 of the second embodiment, too, the constituent members of the lock device 300 can be mounted on the outer member 312 from the rear side of the outer member 312, whereby the mounting work can be facilitated.

Figure 12:
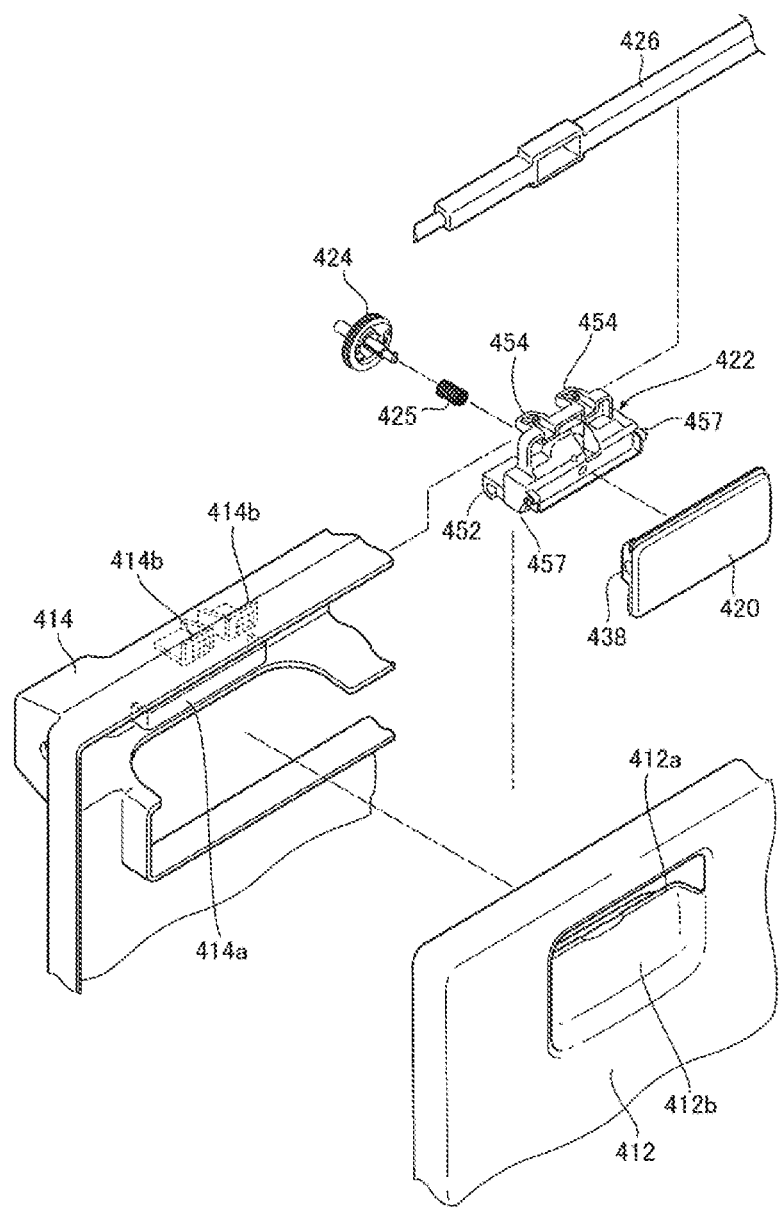
FIG. 12 is an explanatory drawing of a lock device of a modified example made to the second embodiment.

FIG. 12 is an explanatory drawing of a lock device 400 according to a modified example made to the second embodiment. FIG. 12 shows an exploded view of an outer member 412 and an inner member 414 of an openable and closable member. The lock device 400 has an operation member 420, a base member 422, a rotary member 424, a spring member 425, a first rod 426 and a second rod 428. In FIG. 12 showing the outer member 412, the inner member 414 and the first rod 426 of the openable and closable member, portions which are positioned far away from the operation member 420 and the base member 422 are omitted from illustration, and the second rod of the lock device 400 is also omitted from illustration.

In contrast with the lock device 300 of the second embodiment shown in FIG. 9B which is mounted on the outer member 312, the lock device 400 of the modified example shown in FIG. 12 is mounted on the inner member 414. With the lock device 400 of the modified example, since all the constituent members thereof can be mounted on a rear side of the inner member 414, mounting work becomes easy.

The inner member 414 has a mounting edge portion 414a on which a hook portion 452 of the base member 422 is hooked and hole-shaped locking edge portions 414b in which locking claw portions 454 of the base member 422 are locked. The mounting edge portion 414a and the locking edge portions 414b are formed on the rear side of the inner member 414 so as to be spaced apart vertically.

Shaft portions 438 of the operation member 420 are supported pivotally on pivotally supporting portions 457 of the base member 422, whereby the operation member 420 is supported rotatably on the base member 422. The rotary member 424 is supported rotatably on the base member 422. The rotary member 424 rotates as the operation member 420 is operated, and the first rod 426 is reciprocated as the base member 422 rotates. The spring member 425 biases the rotary member 424 so that the first rod 426 travels in a locking direction.

The operation member 420, the rotary member 424 and the spring member 425 are assembled to the base member 422, whereby a subassembly is made up. The subassembly is mounted on the rear side of the inner member 414 after the first rod 426 is mounted on the inner member 414.

Figure 13:
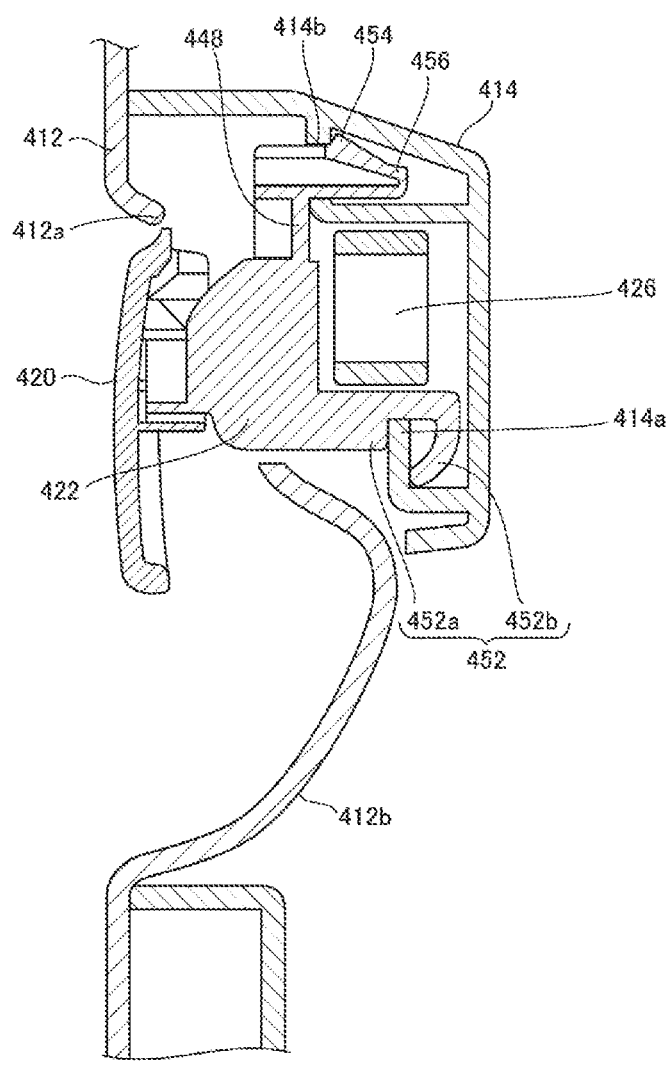
FIG. 13 is a sectional view of the lock device of the modified example made to the second embodiment.

FIG. 13 is a sectional view of the lock device 400 of the modified example of the second embodiment. FIG. 13 shows a vertical section taken along a plane passing through the hook portion 452 and the locking claw portion 454 of the base member 422.

A first hook portion 452a is hooked on the mounting edge portion 414a to restrict the base member 422 from moving in which the base member 422 moves towards the inner member 414, and a second hook portion 452b is hooked on the mounting edge portion 414a to restrict the base member 422 from moving in a direction in which the base member 422 moves away from the inner member 414.

The locking edge portion 414b is formed into the shape of a hole on the rear side of the inner member 414. The locking claw portions 454 are supported on a supporting portion 456 and are locked on the locking edge portions 414b. The supporting portion 456 is erected from a rear surface of a base frame portion 448. The first rod 426 is inserted through a space defined between the hook portion 452 and the locking claw portions 454.

The subassembly in which the operation member 420 is assembled to the base member 422 is mounted on the inner member 414 by rotating the base member 422 about the hook portion 452 as a fulcrum with the hook portion 452 left hooked on the mounting edge portion 414a and pushing in the locking claw portions 454 towards the corresponding locking edge portions 414b to be locked therein.

According to the lock device 400 of the modified example, the constituent members of the lock device 400 can be mounted on the rear side of the inner member 414, and the outer member 412 only has to be closed after the lock device 400 is so mounted, this facilitating the mounting process.

The invention is not limited to the embodiments that have been described heretofore, and hence, modifications including various design changes can be made to the embodiments based on the knowledge of those skilled in the art to which the invention pertains. The resulting embodiments incorporating such modifications can also be included in the scope of the invention.

In the lock device 10 of the embodiment, the first rod 26 and the second rod 28 are described as being brought into engagement with the lock holes in the fixed member. However, the invention is not limited thereto. For example, the first rod 26 and the second rod 28 may be brought into engagement with projecting portions and recessed portions on the fixed member and may be brought into engagement with edges of walls of the fixed member. Namely, surfaces with which the first rod 26 and the second rod 28 are brought into engagement should be on the fixed member, and portions with which the first rod 26 and the second rod 28 are brought into engagement are referred to as locking portions of the fixed member.

In the lock device 10 of the embodiment, the hook portion 52 is described as being hooked on the mounting opening 12a of the outer member 12, however, the invention is not limited thereto. For example, a mounting edge portion on which the hook portion 52 is to be hooked may be formed on the rear side of the outer member 12 in place of the mounting opening 12a.

BRIEF DESCRIPTION OF REFERENCE NUMERALS

10 Lock Device; 12 Outer Member; 12a Mounting Opening; 12b Depressed Portion; 12c First Supporting Hole Portion; 12d Second Supporting Hole Portion; 12e Locking Edge Portion; 12f Mounting Seat Portion; 12g Mounting Edge Portion; 14 Glove Box; 20 Operation Member; 22 Base Member; 24 Rotary Member; 26 First Rod; 26b First Coupling Portion; 26c Bearing Surface; 28 Second Rod; 28b Second Coupling Portion; 35 Base Portion; 36 Operating Portion; 38 Shaft Portion; 38a Rotational Center; 40 Transmitting Portion; 41 Rotation Stopping Portion; 42 Side Wall Portion; 44 Middle Wall Portion; 46 Key Cylinder Bore; 48 Base Frame Portion; 50 Passage Portion; 52 Hook Portion; 52a Front Hook Portion; 52b Rear Hook Portion; 54 Locking Claw Portion; 55 Stopper Portion; 56 Supporting Portion; 57 Pivotally Supporting Portion; 58 First Guide Portion.

INDUSTRIAL APPLICABILITY

The invention relates to the lock device to be mounted on the openable and closable member.

The invention claimed is:

1. A lock device capable of holding an openable and closable member mounted on an opening portion of a fixed member so as to be opened and closed in a locked state and provided in a space defined by an outer member and an inner member of the openable and closable member, the lock device comprising:
   a base member fixed to the outer member;
   an operation member supported rotatably on the base member; and
   a rod configured to be engaged with and disengaged from a locking portion of the fixed member in association with rotations of the operation member,
   wherein the operation member includes:
      an operating portion exposed to a front side of the outer member; and
      a pivotally supporting portion pivotally supported on the base member, and
   wherein the base member includes:
      a hook portion configured to be hooked on a mounting edge portion formed on the outer member; and
      a locking claw portion protruding toward a rear side of the outer member and configured to be locked on a locking edge portion protruding toward the locking claw portion and formed on the rear side of the outer member to restrict the base member from moving in a direction in which the base member moves away from a rear surface of the outer member.

2. The lock device according to claim 1, wherein the locking claw portion is locked on the locking edge portion by being pushed in from the rear side of the outer member with the hook portion hooked on the mounting edge portion from the rear side of the outer member.

3. A lock device capable of holding an openable and closable member mounted on an opening portion of a fixed member so as to be opened and closed in a locked state and provided in a space defined by an outer member and an inner member of the openable and closable member, the lock device comprising:
   a base member fixed to the inner member;
   an operation member supported rotatably on the base member; and
   a rod configured to be engaged with and disengaged from a locking portion of the fixed member in association with rotations of the operation member,
   wherein the operation member includes:
      an operating portion exposed to a front side of the outer member; and
      a pivotally supporting portion pivotally supported on the base member, and
   wherein the base member includes:
      a hook portion configured to be hooked on a mounting edge portion formed on a rear side of the inner member; and
      a locking claw portion protruding toward the rear side of the inner member and configured to be locked on a locking edge portion protruding toward the locking claw portion and formed on the rear side of the inner member to restrict the base member from moving in a direction in which the base member moves away from a rear surface of the inner member.

4. The lock device according to claim 3, wherein the locking claw portion is pushed in relative to the locking edge portion from the rear side of the inner member to be locked therein with the hook portion hooked on the mounting edge portion from the rear side of the inner member.

5. The lock device according to claim 1, wherein the base member further includes a shaft portion supporting the pivotally supporting portion rotatably, and
wherein the shaft portion is positioned between the hook portion and the locking claw portion in a reciprocating direction of the rod.

6. The lock device according to claim 1, wherein the rod partially overlaps the base member in a direction in which the outer member and the inner member face each other,
wherein the locking claw portion extends in the direction in which the outer member and the inner member face each other, and
wherein a shortest distance between the rod and the base member in the direction in which the outer member and the inner member face each other in the position where the rod partially overlaps the base member is smaller than a length of the locking claw portion in the direction in which the outer member and the inner member face each other.

7. The lock device according to claim 3, wherein the locking claw portion comprises a pair of locking claw portions which are spaced apart from each other, and
wherein the rod is inserted through a space defined between the pair of locking claw portions.

8. The lock device according to claim 1, wherein the base member further includes a supporting hole portion allowing a passage of the rod and guiding a reciprocating motion of the rod.

9. The lock device according to claim 3, wherein the base member further includes a shaft portion supporting the pivotally supporting portion rotatably, and
wherein the shaft portion is positioned between the hook portion and the locking claw portion in a reciprocating direction of the rod.

10. The lock device according to claim 3, wherein the base member further includes a supporting hole portion allowing a passage of the rod and guiding a reciprocating motion of the rod.

11. The lock device according to claim 1, wherein, in an axial direction of the lock device, the mounting edge portion and the locking edge portion are disposed on opposing sides of the operation member.

12. The lock device according to claim 1, wherein an engagement direction of locking claw portion to the locking edge portion is different from an engagement direction of the hook portion to the mounting edge portion.

13. The lock device according to claim 1, wherein, in an axial direction of the lock device, the mounting edge portion and the locking claw portion are disposed on opposing sides of the operation member.

14. The lock device according to claim 3, wherein, in an axial direction of the lock device, the mounting edge portion and the locking edge portion are disposed on opposing sides of the operation member.

15. The lock device according to claim 3, wherein an engagement direction of locking claw portion to the locking edge portion is different from an engagement direction of the hook portion to the mounting edge portion.

16. The lock device according to claim 3, wherein, M an axial direction of the lock device, the mounting edge portion and the locking claw portion are disposed on opposing sides of the operation member.

17. A lock device for holding an openable and closable member, the lock device comprising:
a base member secured to the openable and closable member;
an operation member supported rotatably on the base member; and
a rod configured to be engaged with and disengaged from a locking portion of a fixed member according to a rotation of the operation member,
wherein the operation member includes:
an operating portion that is exposed on a surface of the openable and closable member; and
a supporting portion supported by the base member, and
wherein the base member includes:
a hook portion that hooks on a mounting edge portion formed on the operable and closable member; and
a locking claw portion protruding toward the surface of the openable and closable member and configured to be locked on a locking edge portion protruding toward the locking claw portion and formed on the surface of the openable and closable member to restrict the base member from moving in a direction in which the base member moves away from a rear surface of the openable and closable member).

18. The lock device according to claim 17, wherein, in an axial direction of the lock device, the mounting edge portion and the locking edge portion are disposed on opposing sides of the operation member.

19. The lock device according to claim 17, wherein an engagement direction of locking claw portion to the locking edge portion is different from an engagement direction of the hook portion to the mounting edge portion.

20. The lock device according to claim 17, wherein, in an axial direction of the lock device, the mounting edge portion and the locking claw portion are disposed on opposing sides of the operation member.

* * * * *